No. 748,092. PATENTED DEC. 29, 1903.
B. G. OLSON.
GATE.
APPLICATION FILED JULY 30, 1903.
NO MODEL. 2 SHEETS—SHEET 1.
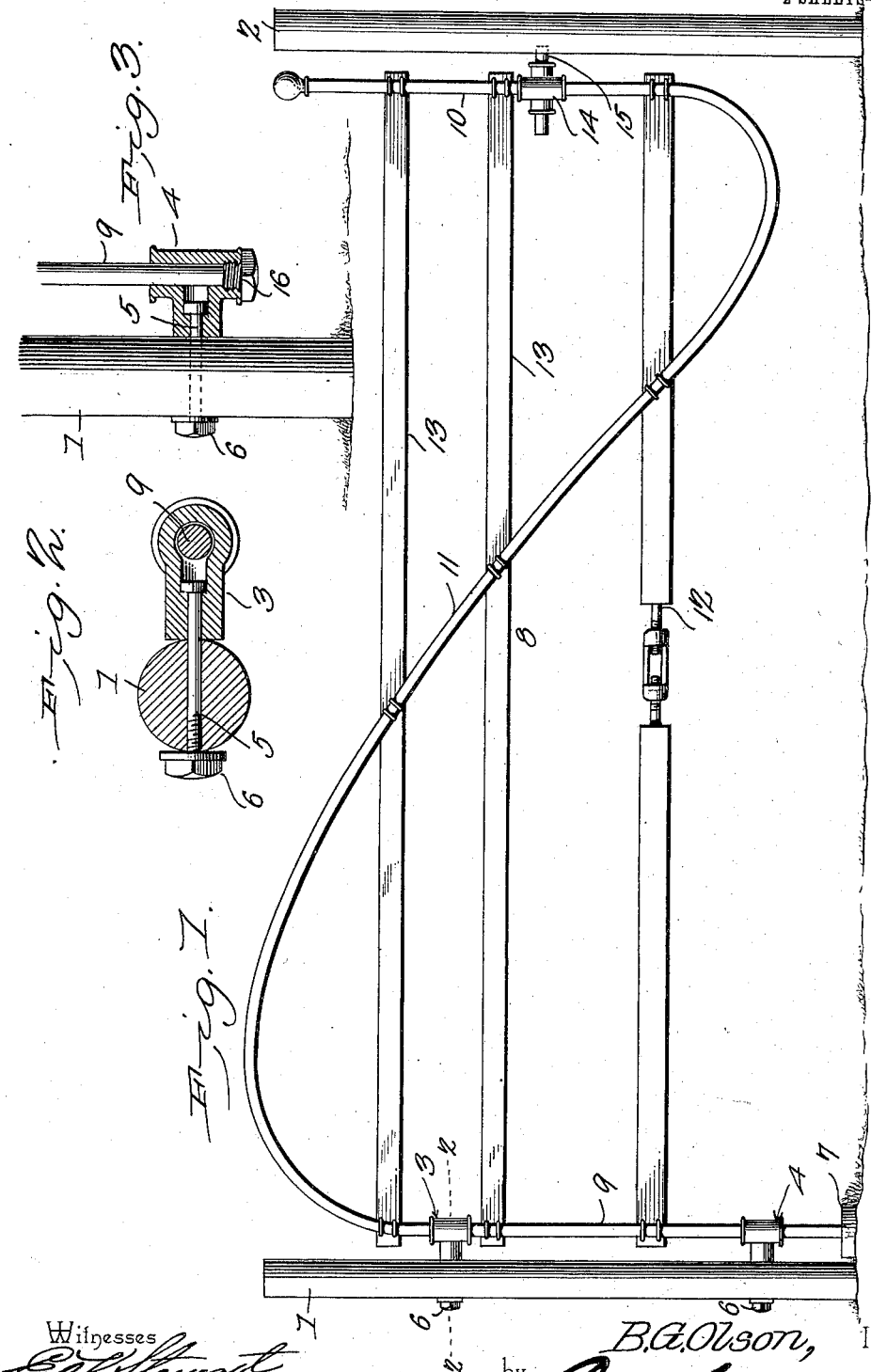
Witnesses
E. F. Stewart
G. A. Elmore
B. G. Olson, Inventor
by C. A. Snow & Co.
Attorneys No. 748,092. PATENTED DEC. 29, 1903.
B. G. OLSON.
GATE.
APPLICATION FILED JULY 30, 1903.
NO MODEL. 2 SHEETS—SHEET 2.

Witnesses
E. K. Stewart
F. S. Elmore

B. G. Olson, Inventor.
by C. A. Snow & Co.
Attorneys

No. 748,092. Patented December 29, 1903.

UNITED STATES PATENT OFFICE.

BERNARD G. OLSON, OF CHINOOK, MONTANA.

GATE.

SPECIFICATION forming part of Letters Patent No. 748,092, dated December 29, 1903.

Application filed July 30, 1903. Serial No. 167,623. (No model.)

*To all whom it may concern:*

Be it known that I, BERNARD G. OLSON, a citizen of the United States, residing at Chinook, in the county of Choteau and State of Montana, have invented a new and useful Gate, of which the following is a specification.

My invention relates to gates, and has for its objects to produce a device of this character of simple construction which will be efficient in operation, one in which its forward end will be prevented from sagging and may be adjusted to vary its height from the ground, and one in which an easy movement of the gate is attained.

To these ends the invention comprises the novel details of construction and combination of parts more fully hereinafter described.

Figure 5:
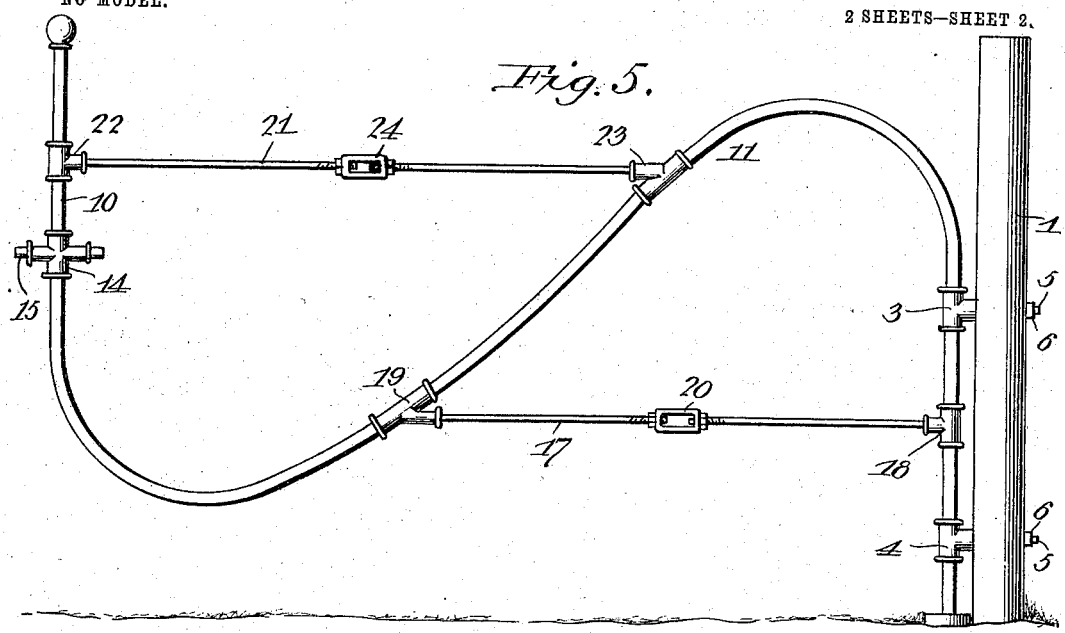
Figure 4:
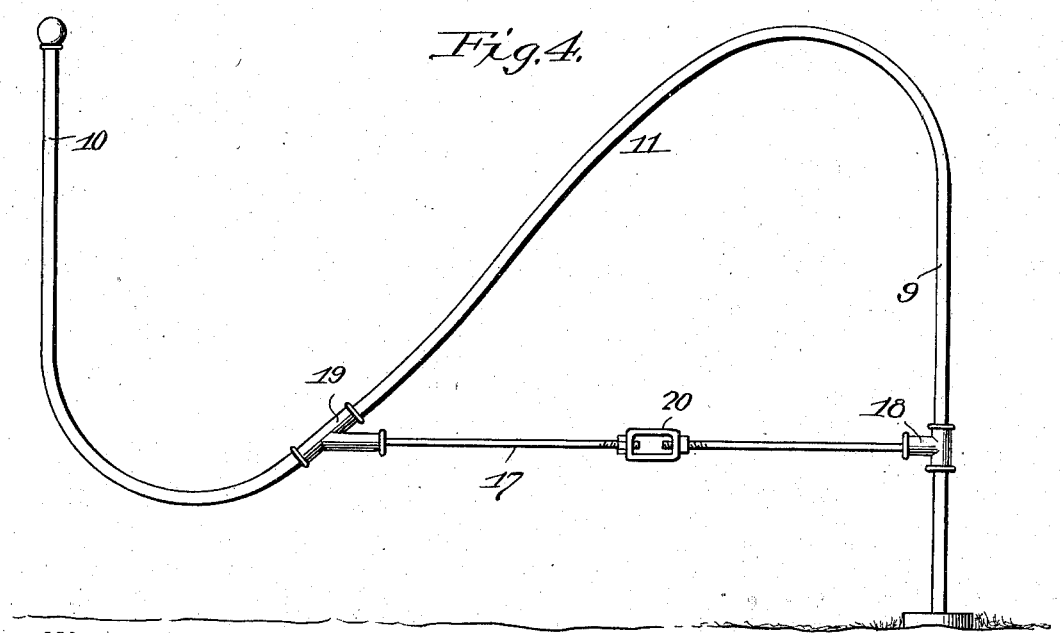

In the accompanying drawings, Figure 1 is a side elevation of the gate embodying my invention. Fig. 2 is a detail view on the line 2 2 of Fig. 1. Fig. 3 is a detail view of a slight modification. Fig. 4 is a side elevation of another form of the embodiment of the invention. Fig. 5 is a similar view of still another form.

Referring to the drawings, 1 indicates the hinge-post, to which my improved gate is pivoted, and 2 the latch-post, upon which the same closes, which parts may, except as hereinafter specified, be of any suitable material or structure.

3 indicates the upper and 4 the lower pivoting or hinge members disposed, respectively, adjacent to the upper and lower ends of the post 1. These members are each in the form of a T-pipe, the tubular head of which is vertical, while its tubular stem is horizontal and receives the headed end of a horizontal bolt 5, which extends transversely through the post and is secured thereto by a nut 6 tapped on to its outer end, a suitable washer being disposed between the nut and post to prevent wearing of the latter. At the lower end of the post, directly beneath the member 4, there is embedded in the ground a block 7, of stone or other suitable material, to form a bearing for the pivoting-rod of the gate, as more fully hereinafter described.

8 indicates a gate which, in accordance with my invention, comprises a suitable length of pipe or other similar material bent, as herein shown, to substantially S or Z form and so disposed that a portion of the pipe corresponding to one end of the letter will form the rear end bar or pivoting-rod 9 of the gate, while the other end of the letter will form the front end or latch-bar 10, these bars being connected by an integral diagonal brace 11, corresponding to the stem or body of the latter. The pivoting bar or rod 9 extends loosely through the tubular T-heads of the members 3 and 4, which are disposed in vertical alinement, and rests at its lower end upon the bearing 7, which latter sustains the chief wear incident to opening and closing the gate and may be readily replaced when needful, while the members 3 and 4 loosely encircle the rod and insure free turning of the latter.

12 indicates a brace or tension member extending horizontally of the gate adjacent to its lower edge and secured by staples or in other suitable manner to the bars 9 and 10 and the brace 11. This member, which may be provided with a suitable turnbuckle or other adjusting device, serves to maintain the parts under tension and prevent sagging of the gate at its front end. It may also be manipulated for regulating the elevation of the front and lowest portion of the gate relative to the ground to provide for the latter overriding obstructions. The tension of the member may be regulated or adjusted for said purposes by manipulating the turnbuckle, as is obvious.

13 13 indicate boards extending longitudinally of the gate between the bars 9 and 10 for the purpose of filling the latter and giving it a finished appearance. These boards may be replaced by fencing-wires, if so desired.

14 is a latch-support in the form of a cross-coupling carried by the bar 10 and provided with a horizontally-extending latch 15, adapted to engage a suitable socket in the post 2 when the gate is closed.

In Fig. 3 I have illustrated a slight modification in the manner of pivoting the gate, in which the block 7, constituting the bearing for the lower end of rod 9, is dispensed with and a plug 16 screwed into the lower end of the hinge member 4 to serve as a bearing for the lower end of the pivoting-rod, the purpose of this being to obtain a greater elevation of the gate from the ground. In other respects the construction and operation of the parts is identical with that above described.

In Fig. 4 I have shown the gate as provided with a brace or tension member 17, corresponding to the brace 12, but extending simply between the bar 9 and brace 11, said parts being provided, respectively, with a T-coupling 18 and Y-coupling 19 for engagement with the opposite ends of the tension member 17. This latter is provided with a turnbuckle 20, by which the tension may be regulated for the purpose described in connection with brace 12.

In Fig. 5, in addition to the brace 17 and its attendant parts, as shown in Fig. 4, I have further provided the gate with a brace or tension member 21, extending between the upper end of bar 10 and the diagonal brace 11, said parts being provided, respectively, with a T-coupling 22 and Y-coupling 23 for the reception of the opposite ends of the brace. The latter is composed of two sections joined by a coupling or turnbuckle 24. This brace serves the especial function of drawing the bar 10 toward the brace 11, and thus elevating the front end of the gate to override obstructions. It is also to be noted that in this form of gate the braces 20 and 21 constitute the top and bottom bars of the gate and at the same time give the latter a neat finished appearance.

From the foregoing it will be seen that I produce a device of simple construction which in practice will efficiently perform its functions to the attainment of the ends in view. It is to be understood that I do not wish to limit myself to the precise details herein set forth, inasmuch as minor changes therein may be made without departing from the spirit of the invention.

Having thus described my invention, what I claim is—

1. The combination with a gate comprising a front bar, a rear bar and a diagonal brace formed continuous, of a horizontal tension member extending across the lower portion of the gate and connected with the brace and rear bar, said member comprising a pair of sections and a turnbuckle connecting the sections and operable for varying the tension of the member.

2. The combination with a gate comprising a front bar, a rear bar and a diagonal brace formed continuous, of a horizontal tension member extending across the lower portion of the gate and connected with the brace and rear bar, said member comprising a pair of sections, and a turnbuckle connecting the sections operable for varying the tension of the member, and a tension member extending across the upper portion of the gate and connected with the brace and front bar.

3. The combination with a gate comprising a front bar, a rear bar and a diagonal brace all formed continuous, of a rigid horizontal tension member extending across the lower portion of the gate and continuously engaged with the brace and rear bar, and an adjusting device permanently carried by the member and operating thereon to prevent sagging of the forward portion of the gate.

4. The combination with a hinge-post, of tubular pivoting members carried thereby, a gate having a pivoting-rod extending loosely through said members, and a plug seated in the end of the lower member and forming a bearing for the lower end of the rod.

5. The combination with a hinge-post, of hinge members carried thereby and each having a vertically-disposed tubular portion and a horizontal tubular portion, a gate having a pivoting-rod engaging the vertical tubular portions of the members, and bolts extending through the horizontal portions of the members and the post for attaching the former to the latter.

In testimony that I claim the foregoing as my own I have hereto affixed my signature in the presence of two witnesses.

BERNARD G. OLSON.

Witnesses:
G. E. FULLER,
HARRY ORR.